US011479419B2

(12) United States Patent
Richards

(10) Patent No.: US 11,479,419 B2
(45) Date of Patent: Oct. 25, 2022

(54) AUTOMATED MACHINE FOR UNLOADING AND TRANSFERRING CUT AND TRIMMED POULTRY MEAT PIECES

(71) Applicant: F.R. Drake Company, Waynesboro, VA (US)

(72) Inventor: Andre G. Richards, Charlottesville, VA (US)

(73) Assignee: F.R. Drake Company, Waynesboro, VA (US)

( * ) Notice: Subject to any disclaimer, the term of this patent is extended or adjusted under 35 U.S.C. 154(b) by 487 days.

(21) Appl. No.: 16/782,358

(22) Filed: Feb. 5, 2020

(65) Prior Publication Data

US 2020/0247618 A1  Aug. 6, 2020

Related U.S. Application Data

(60) Provisional application No. 62/801,223, filed on Feb. 5, 2019.

(51) Int. Cl.
*B65G 47/00* (2006.01)
*B65G 47/71* (2006.01)
(Continued)

(52) U.S. Cl.
CPC .......... *B65G 47/71* (2013.01); *A22C 21/0053* (2013.01); *A22C 21/0061* (2013.01);
(Continued)

(58) Field of Classification Search
CPC .. A22C 21/0053; A22C 21/0061; A22C 21/06
(Continued)

(56) References Cited

U.S. PATENT DOCUMENTS

| 5,902,177 A * | 5/1999 | Tessier | A22C 17/0046 |
| | | | 452/158 |
| 7,476,150 B2 * | 1/2009 | Ilch | B25J 15/0071 |
| | | | 452/198 |

(Continued)

FOREIGN PATENT DOCUMENTS

| EP | 2168892 A1 | 3/2010 |
| EP | 2174551 A1 | 4/2010 |
| WO | 2005051812 A1 | 6/2005 |

OTHER PUBLICATIONS

Partial EP Search Report from Corresponding PCT Application—PCT/US2020/016739—dated May 26, 2020.
(Continued)

*Primary Examiner* — Richard T Price, Jr.
(74) *Attorney, Agent, or Firm* — Berenato & White, LLC

(57) ABSTRACT

An automated unloading machine for unloading cut and trimmed raw poultry meat pieces from an upstream poultry meat cutting machine. The automated unloading machine is operably associated with a feed conveyer configured to support the cut and trimmed poultry meat pieces provided by the meat cutting machine. The automated unloading machine comprises one of an exit conveyor movable in a second direction and a packaging machine, an electronic controller configured to receive and process position and orientation data of the poultry meat pieces located on the feed conveyer, and a robotic picking device operatively associated with the electronic controller and configured to pick the poultry meat pieces from the feed conveyer and place them onto one of the exit conveyor and the packaging machine so that the cut and trimmed poultry meat pieces are arranged on one of the exit conveyor and the packaging machine in a desired orientation.

16 Claims, 6 Drawing Sheets

(51) Int. Cl.
*A22C 21/00* (2006.01)
*B25J 11/00* (2006.01)
*B25J 15/00* (2006.01)
*B65G 47/90* (2006.01)
*A22C 21/06* (2006.01)

(52) U.S. Cl.
CPC ........... *A22C 21/06* (2013.01); *B25J 11/0045* (2013.01); *B25J 15/0028* (2013.01); *B65G 47/902* (2013.01); *B65G 47/905* (2013.01)

(58) Field of Classification Search
USPC ......................................................... 452/183
See application file for complete search history.

(56) References Cited

U.S. PATENT DOCUMENTS

| | | |
|---|---|---|
| 8,092,283 B2 | 1/2012 | Hansen |
| 8,560,121 B2 | 10/2013 | Hjornet |
| 8,708,782 B2* | 4/2014 | Kessler ................. A22C 15/001 |
| | | 452/51 |
| 8,862,262 B2* | 10/2014 | Thorsson ........... A22C 17/0093 |
| | | 452/157 |
| 2010/0101191 A1 | 4/2010 | Lindee |
| 2011/0207388 A1* | 8/2011 | Hansen ................ B25J 11/0045 |
| | | 452/121 |
| 2022/0132872 A1* | 5/2022 | Blaine ................ A22C 17/0093 |
| | | 452/157 |

OTHER PUBLICATIONS

International Search Report from Corresponding PCT Applicatio—PCT/US2020/016739—dated Jul. 24, 2020.

Shai Barbut: "Chapter 5 Primary Processing of Poultry the Science of Poul try and Meat Proces sing", Jan. 1, 2015 (Jan. 1, 2015), XP055280823, ISBN: 978-0-88955-626-3 Retrieved from the Internet: URL:http://download.poultryandmeatprocessing.com/v02/SciPoultryAndMeatProcessing-Barbut-PrimaryProcessingv02.pdf [retrieved on Jun. 15, 2016] the whole document.

* cited by examiner

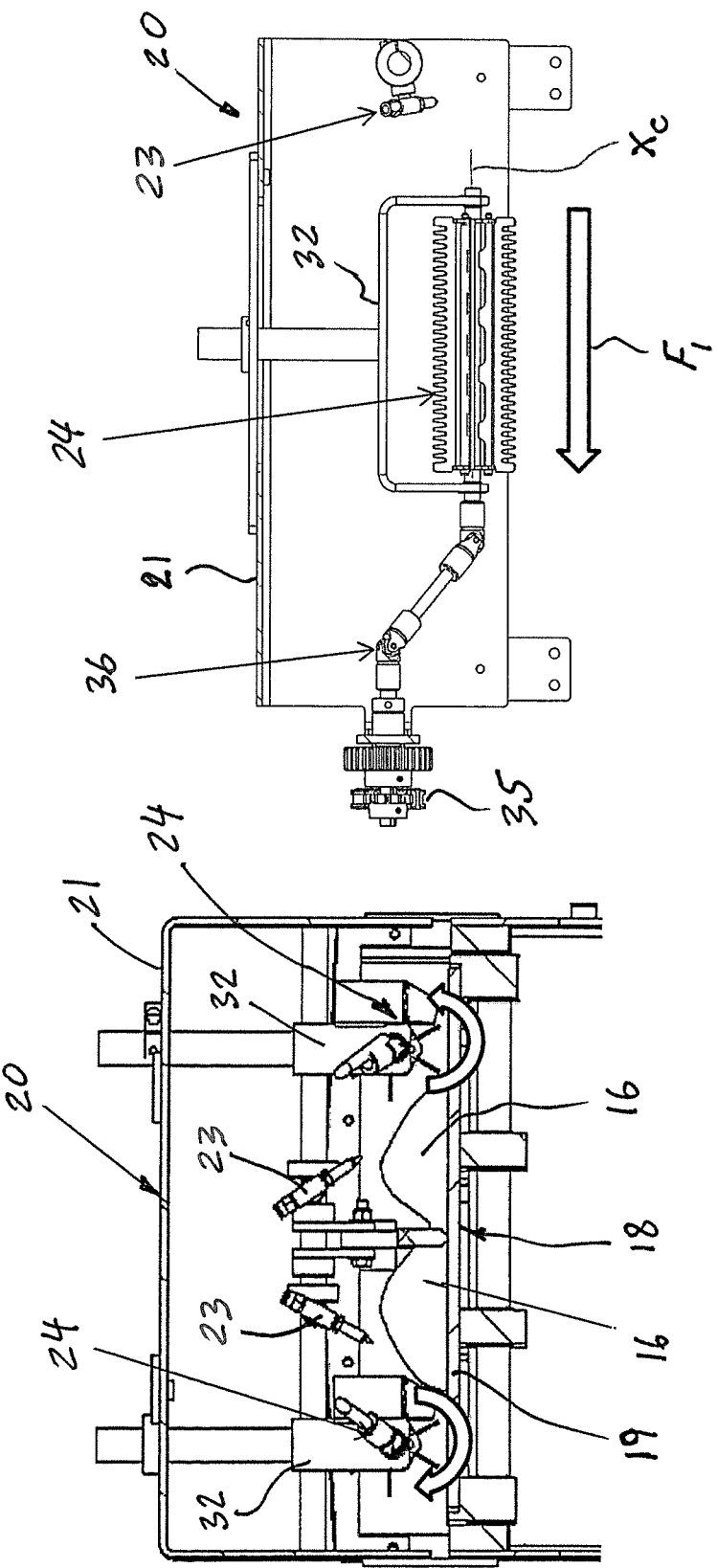

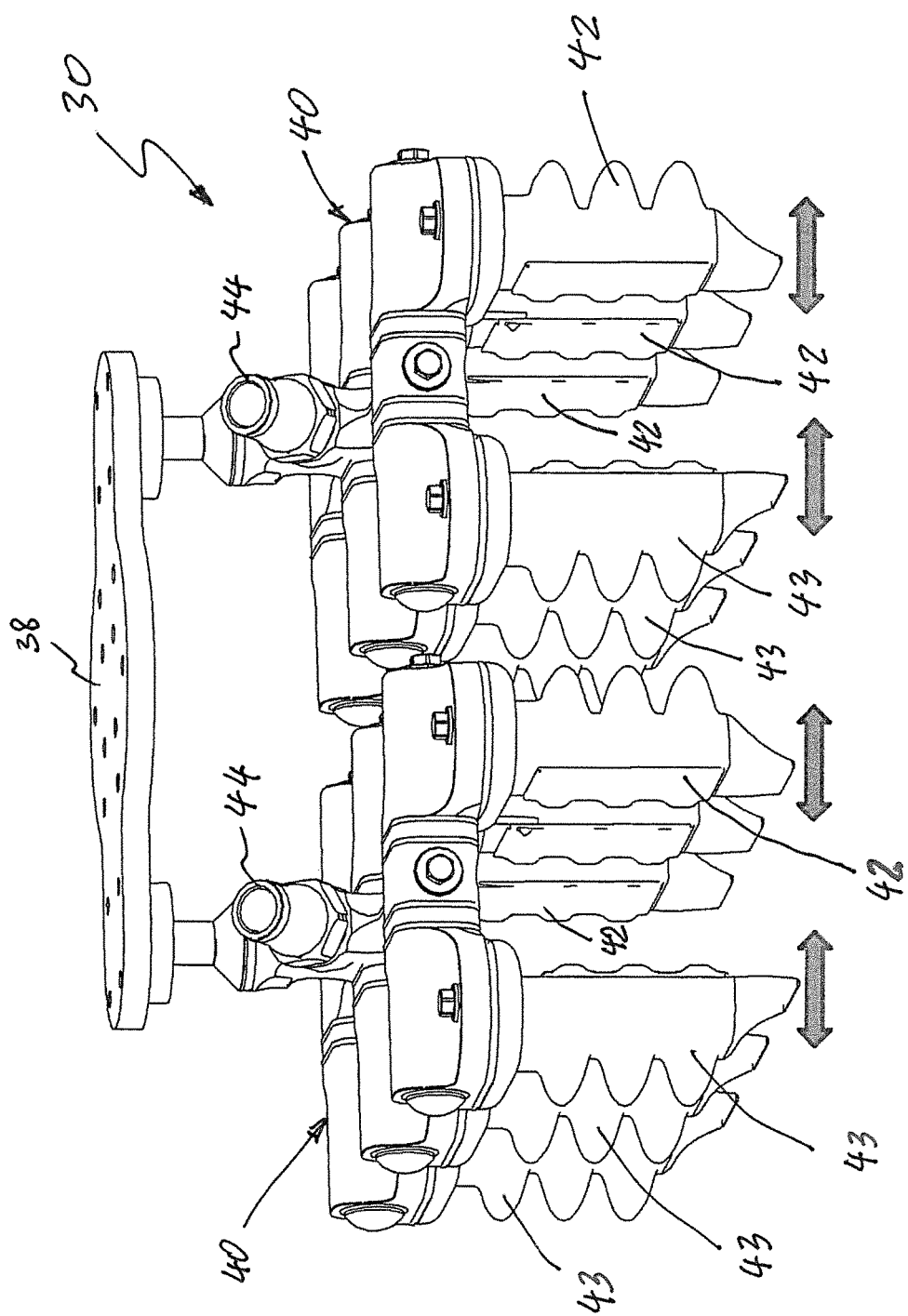

AUTOMATED MACHINE FOR UNLOADING AND TRANSFERRING CUT AND TRIMMED POULTRY MEAT PIECES

CROSS-REFERENCE TO RELATED APPLICATION AND CLAIM TO PRIORITY

This application is related to U.S. Provisional Patent Application Ser. No. 62/801,223 filed Feb. 5, 2019 by Andre Richards, which is hereby incorporated herein by reference in its entirety and to which priority is claimed.

BACKGROUND OF THE INVENTION

1. Field of the Invention

The present invention relates to automated food processing, and more particularly to an automated machine for unloading/picking raw meat from a feed conveyor operatively connected to a meat cutting machine provided to cut pieces of meat and/or trim trimming material of the meat. The meat is subject to further trim removal and, thereafter, placed on an exit conveyor for further processing. In a preferred embodiment, the invention is directed to an automated machine for transferring cut pieces of poultry from a feed belt downstream of a water jet cutting/trimming machine to an exit conveyor operatively associated with a packaging machine in which the poultry is packaged.

2. Background of the Invention

The rising cost of labor as well as the shortage of meat processing plant workers has created a growing need for automation. For example, one response to this need was the creation and introduction of a waterjet meat cutting machine to do the trimming and cutting of chicken meat that was previously done by hand. This waterjet trim solution still requires workers on an exit conveyor of the waterjet to separate the resultant trim from the remainder of the chicken meat clinging thereto, and to further separate the cut pieces of chicken meat inasmuch as they can remain stuck together.

Therefore, food processing assemblies are susceptible to improvements. With this in mind, a need exists to develop an automated machine for unloading raw meat, such as chicken meat, that eliminates the labor required at the exit of the meat cutting machine, and advances the art.

BRIEF SUMMARY OF THE INVENTION

According to an aspect of the invention, there is provided an automated unloading machine for unloading cut and trimmed poultry meat pieces from an upstream poultry meat cutting machine. The automated unloading machine is operably associated with a feed conveyer configured to support the cut and trimmed poultry meat pieces provided by the meat cutting machine. The automated unloading machine includes one of an exit conveyor or a packaging machine, an electronic controller configured to receive and process position and orientation data of the poultry meat pieces located on the feed conveyer, and a robotic picking device operatively associated with the electronic controller and configured to pick the poultry meat pieces from the feed conveyer and to place the poultry meat pieces onto one of the exit conveyor and the packaging machine so that the cut and trimmed poultry meat pieces are arranged on one of the exit conveyor or the packaging machine in a desired orientation.

Other aspects of the invention, including apparatus, devices, systems, processes, and the like which constitute part of the invention, will become more apparent to one of ordinary skill in the art upon reading the following detailed description of the exemplary embodiment(s) and drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals. In these drawings:

FIG. 5A is a sectional view of the trim removing device taken along the line 5A-5A in FIG. 4A;

FIG. 5B is a sectional view of the trim removing device taken along the line 5B-5B in FIG. 4A;

FIG. 6 depicts a pick-head of a robotic picking device.

DETAILED DESCRIPTION OF PREFERRED EMBODIMENTS

Figure 1:
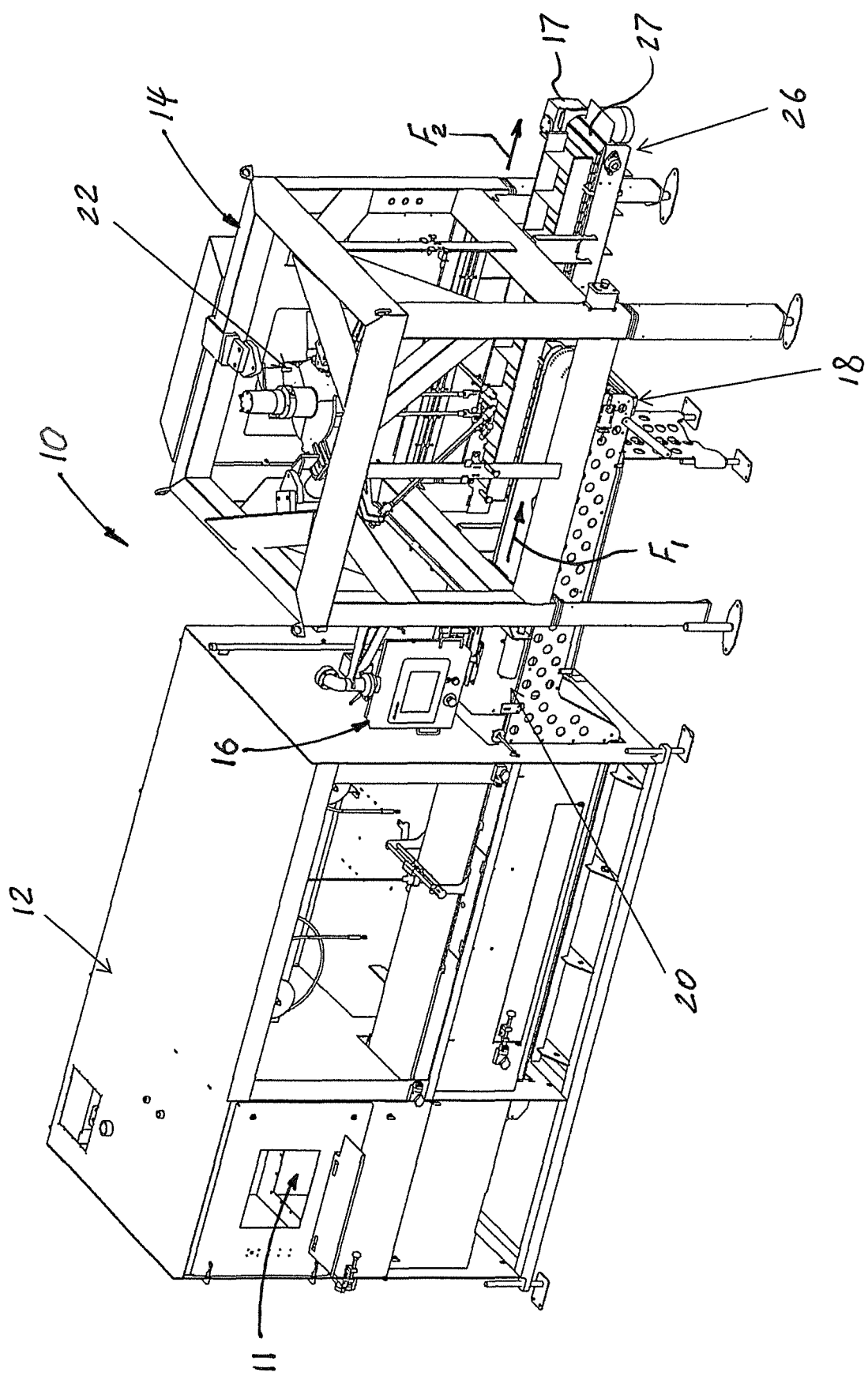
FIG. 1 is a perspective view of a poultry meat product unloading system in accordance with an exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "inner" and "outer", "inside" and "outside," "horizontal" and "vertical," "front" and "rear," "upper" and "lower," "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows pertinent structures to operate as intended by virtue of that relationship. The term "integral" (or "unitary") relates to a part made as a single part, or a part made of separate components fixedly (i.e., non-moveably) connected together. Additionally, the words "a" and/or "an" as used in the claims mean "at least one" and the word "two" as used in the claims means "at least two". For the purpose of clarity, some technical material that is known in the related art has not been described in detail in order to avoid unnecessarily obscuring the disclosure.

Figure 2:
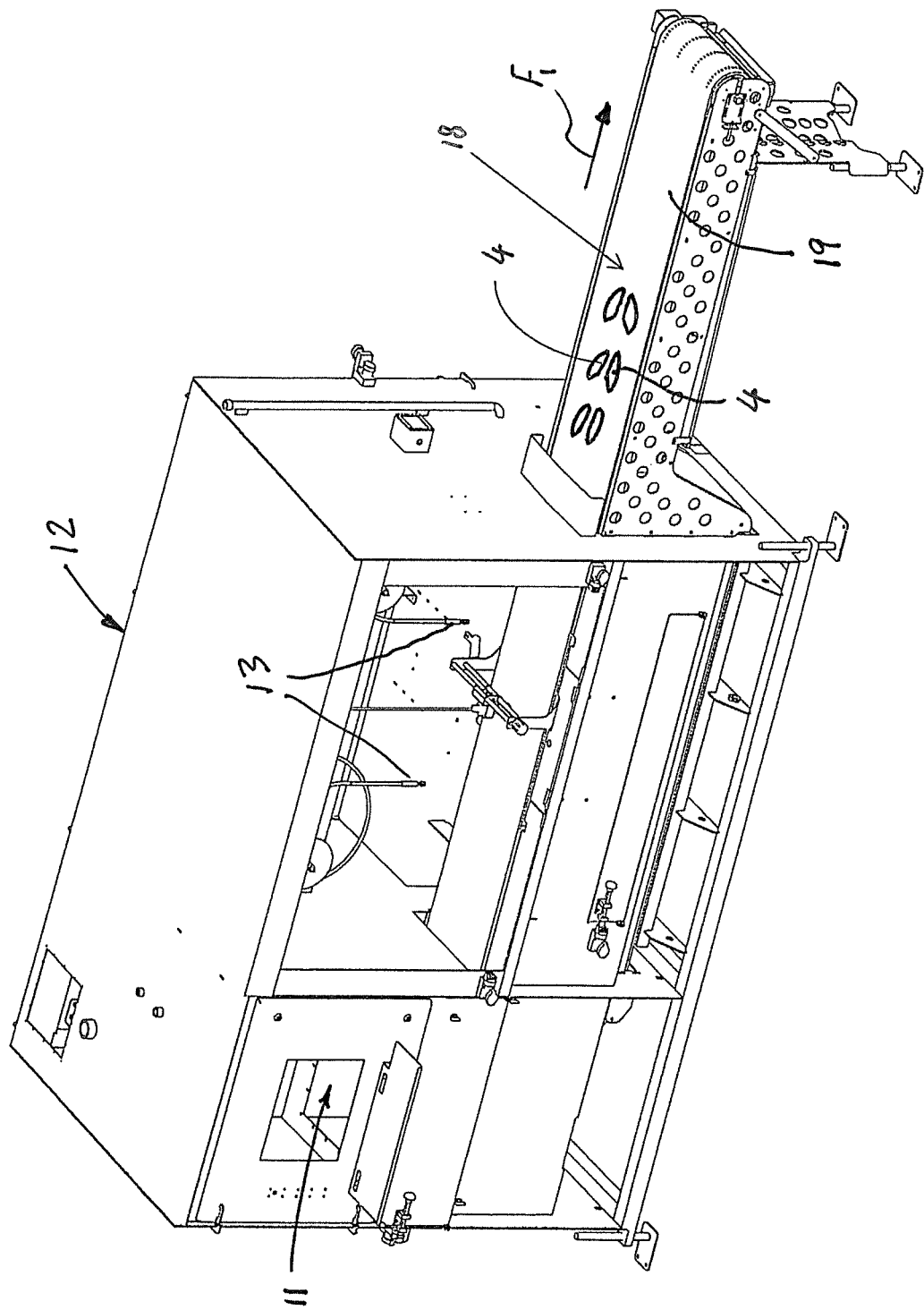
FIG. 2 is a perspective view of a waterjet meat cutting machine and of a feed conveyor.
Figure 3:
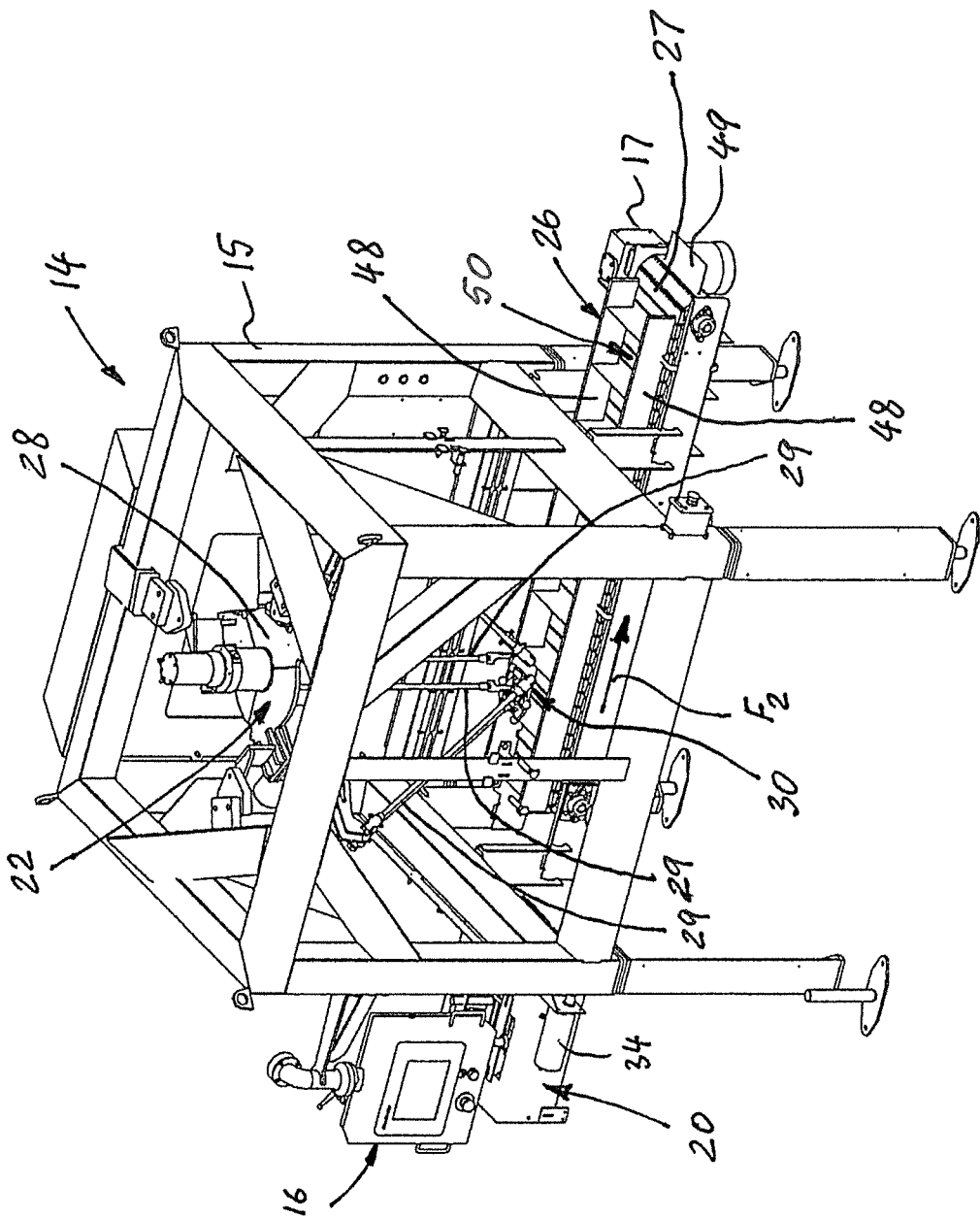
FIG. 3 is a perspective view of a poultry meat product automated unloading machine in accordance with the exemplary embodiment of the present invention.

FIGS. 1-3 of the accompanying drawings illustrate an exemplary embodiment of an unloading system 10 for unloading a raw meat, especially poultry meat product, particularly a raw chicken meat product, of the present invention. While the invention is explained with regard to use with poultry meat, those skilled in the art will recognize that it may be utilized with other sorts of meat products that are first cut and then packaged in an adjacent packaging line. The poultry meat product unloading system 10 of the present invention comprises a raw poultry meat cutting machine 12 (best shown in FIG. 2), such as MiniJet™ by MP Equipment, and an automated unloading machine (or unloader) 14 according to the exemplary embodiment of the present invention (best shown in FIG. 3). In the exemplary embodiment, the poultry meat cutting machine 12 is in the form of a waterjet cutting machine. The waterjet cutting machine 12 includes one or more waterjet nozzles (water cutters) 13, and is provided for cutting of (or separating) raw poultry meat (such as deskinned and deboned butterflied chicken breasts) from the connected cartilage to make two breast pieces (or items) 4, as best shown in FIG. 2. Additionally, the waterjet cutting machine 12 may perform trimming of material, such as fat, of the chicken meat or may cut the chicken meat into pieces, such as strips, nuggets, etc. At least some of the cut and trimmed (or cut/trimmed) poultry meat pieces 4 usually have one or more pieces of trimmed material (or trim), such as trimmed fat, not completely separated from the meat pieces 4 and clinging thereto or loose trim stuck thereto. Moreover, some of the cut/trimmed poultry meat pieces 4 can stick to one another.

The unloading machine 14 according to the exemplary embodiment is operably associated with a feed conveyor 18 of the waterjet cutting machine 12. The unloading machine 14 comprises a frame 15, a trim removing device (or trim remover) 20 (best shown in FIG. 4A), a robotic picking device 22, and an exit conveyor 26 including a conveyor belt 27. The feed conveyer 18 is configured to support the cut and trimmed chicken meat pieces 4 provided by the meat cutting machine 12. Specifically, as illustrated in FIG. 2, the cut/trimmed chicken meat pieces 4 are arranged on a conveyor belt 19 of the feed conveyer 18. The cut/trimmed poultry meat pieces 4 exit the waterjet cutting machine 12 and enter the unloading machine 14 on the feed conveyer 18. The feed conveyer 18 is movable in a first direction $F_1$, as illustrated in FIGS. 1 and 2. The exit conveyor 26 is movable in a second direction $F_2$ parallel to the first direction $F_1$ of the feed conveyer 18, as illustrated in FIGS. 1 and 3. As best shown in FIG. 1, the feed conveyer 18 is spaced from the exit conveyor 26 in a direction orthogonal to the first and second directions. Moreover, as best shown in FIGS. 1 and 3, the exit conveyor 26 further includes a pair of opposite longitudinal side walls 48 non-moveable relative to the frame 15 of the unloading machine 14 and extending in the first direction $F_1$, and a plurality of transverse walls 49 secured to the conveyor belt 27 of the exit conveyor 26 so as to move with the conveyor belt 27 with the same speed. As illustrated in FIG. 3, the longitudinal side walls 48 in combination with the transverse walls 49 define a plurality of compartments 50 on the conveyor belt 27 of the exit conveyor 26.

Figure 4B:
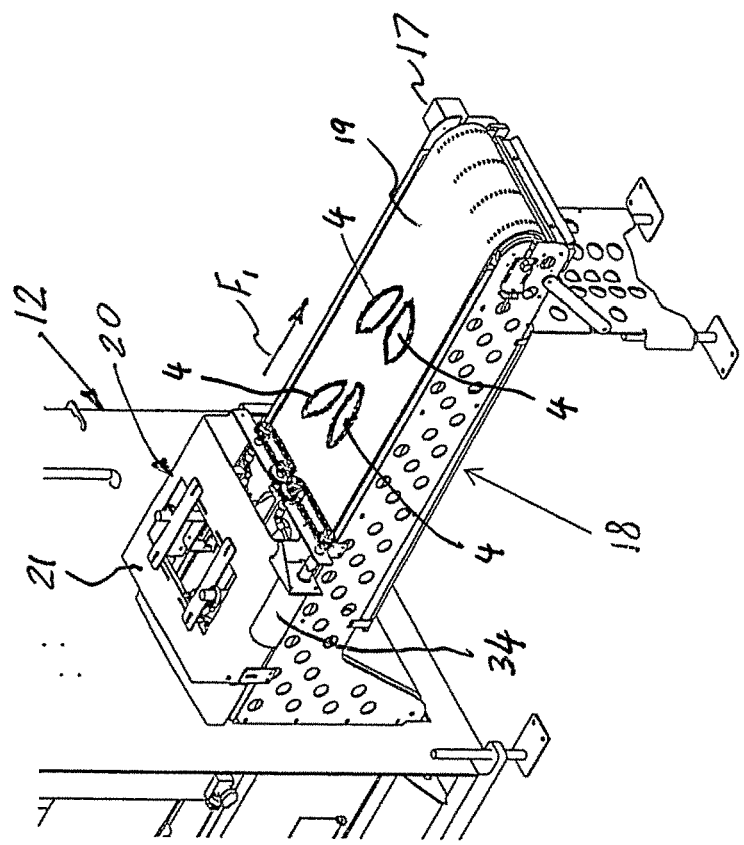
FIG. 4B is a perspective view of the trim removing device of FIG. 4A mounted to the feed conveyor.
Figure 4A:
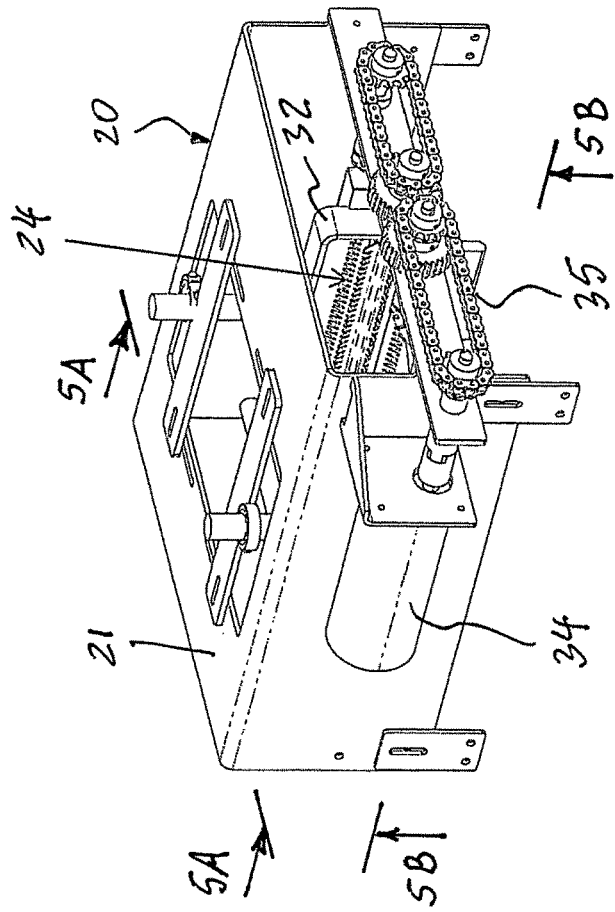
FIG. 4A is a perspective view of a trim removing device of the automated unloading machine in accordance with the exemplary embodiment of the present invention.

The trim remover 20 is configured to remove loose trim from at least one of the poultry meat pieces 4. The trim remover 20 is positioned alongside the feed conveyor 18, as best shown in FIG. 4B. The trim remover 20 includes a casing 21 non-moveably secured (i.e., fixed) to the feed conveyor 18, and at least one air nozzle 23 mounted to the casing 21. The at least one pressurized air nozzle 23 is configured to blow loose trim away from (or off) at least one of the poultry meat pieces 4 with pressurized air. According to the exemplary embodiment, the trim remover 20 includes two spaced angularly oriented air nozzles 23, both mounted to the casing 21, so that each of the air nozzles 23 is directed to one of the poultry meat pieces 4, as best shown in FIG. 5A. While two nozzles 23 are disclosed, additional nozzles may be used and set at additional angles in order to blow trim from other poultry meat pieces. As further illustrated in FIG. 5A, the air nozzles 23 are disposed above the feed conveyer 18 and the nozzles 23 are spaced so as to target a different side of the chicken pieces 4 or to target a side of one of each of a pair of adjacently disposed chicken pieces 4.

In cases where one or more loose pieces of trim are still attached to the raw poultry meat pieces 4 (after blowing the loose pieces of trim off the chicken meat pieces 4 with pressurized air by the air nozzles 23), the trim remover 20 may further include at least one rotatable scrubber brush 24 mounted to the casing 21 downstream of the at least one air nozzle 23. The at least one scrubber brush 24 is configured to remove the loose trim from the at least one of the poultry meat pieces 4. The at least one scrubber brush 24 is located on a side of the feed conveyer 18, and operates to grab or brush the piece(s) of the trim and pull it/them away from the poultry meat pieces 4. Removing the trim while the poultry meat pieces 4 are still on the feed conveyer 18 keeps the trim where it would normally be collected to use in other food products. According to the exemplary embodiment of the present invention, the trim remover 20 includes two scrubber brushes 24, both mounted to the casing 21 downstream of the air nozzles 23. Moreover, the two scrubber brushes 24 are located on transversely (i.e., orthogonally to the first direction $F_1$) opposite sides of the feed conveyer 18 so that each of the scrubber brushes 24 is disposed adjacent to one of the poultry meat pieces 4, as best shown in FIG. 5A. As further illustrated in FIG. 5A, the scrubber brushes 24 are disposed above the feed conveyer 18.

FIGS. 4A-4B and 5A-5B show details of the trim remover 20 with the scrubber brushes 24. Each of the scrubber brushes 24 has an elongate configuration with a length of about 2-4 feet. The length and location of each of the scrubber brushes 24 relative to the poultry meat pieces 4 is sufficient to provide sufficient interaction between the poultry meat pieces 4 and the rotating scrubber brushes 24 to adequately remove the loose trim from the poultry meat pieces 4 prior to placement onto the conveyor belt 27 of the exit conveyor 26. In other words, the rotating scrubber brushes 24 engage loose trim dangling from and/or stuck to the poultry meat pieces 4. Each of the scrubber brushes 24 is supported on the casing 21 at each end thereof via a frame 32. Moreover, each of the scrubber brushes 24 is oriented so that a rotational axis Xc thereof is parallel to the first direction $F_1$ of the feed conveyer 18, as best shown in FIG. 5B. Furthermore, the scrubber brushes 24 are driven in rotation at about 60-140 rpm, preferably by a single electric drive motor 34 via a chain drive 35 and a drive train 36 including a drive shaft and a pair of U-joints (universal joints) interconnecting the inclined drive shaft with the chain drive 35 and one of the scrubber brushes 24, as best shown in FIG. 5B. The drive train 36 transmits rotary motion from the electric drive motor 34 to the scrubber brushes 24, which are spaced from one another, i.e., not in-line.

According to the exemplary embodiment, the scrubber brushes 24 are placed alongside the feed conveyer 18 of the unloading machine 14 so that the additional trim removed by the scrubber brushes 24 may be captured where trim pieces removed by the air nozzles 23 are already accumulated, i.e., on the feed conveyer 18. Moreover, the scrubber brushes 24 rotate in opposite directions. The air nozzles 23 and the scrubber brushes 24 are both adjustable (i.e., moveable in response to a motor or other drive) in the direction orthogonal to the first direction $F_1$ in order to adjust the position of both the air nozzles 23 and the scrubber brushes 24 relative to the conveyor belt 27 of the exit conveyor 26. It is desirable to move the waterjet nozzles 23 periodically from one side of the exit conveyor 26 to the other in order to prevent them from causing wear in one spot along the conveyor belt 27 of the exit conveyor 26.

In operation, the poultry meat pieces 4 exiting the waterjet cutting machine 12 move on the feed conveyer 18 through the trim remover 20 for a sufficient length of time to loosen and remove any trim clinging and/or stuck to the poultry meat pieces 4.

The robotic picking device 22 is configured to pick the poultry meat pieces 4 from the feed conveyer 18 according to position and orientation data of the poultry meat pieces 4 and to place the poultry meat pieces 4 onto the exit conveyor 26 so that the cut and trimmed poultry meat pieces 4 are arranged on the exit conveyor 26 in a desired orientation and location into the compartments 50. The desired position of the poultry meat pieces 4 on the exit conveyor 26 is defined herein as a position of the poultry meat pieces 4 along or transverse to the second direction $F_2$ of the exit conveyor 26, in pair or one behind the other.

As best shown in FIGS. 1 and 2, the present invention cooperates with a scanner 11, such as a laser scanner, that identifies locates, determines the position and orientation of and creates a 3D profiling of the individual poultry meat pieces being cut/trimmed on the feed conveyor 18. The scanner 11, such as a scanning system designed and available from MP Equipment, is operatively connected to an electronic controller 16 of the unloading machine 14, such as through a wired or wireless connection, to the unloading machine 14 (best shown in FIGS. 1 and 3). Laser scanner 16 is a component of the waterjet cutting machine and utilizes the location, orientation and 3D imaging to control the waterjet cutter in order to identify the poultry meat, determine its location and orientation on the feed belt and ascertain the location of the cartilage and any fat requiring trimming, in order to provide that data to a controller operating the waterjet cutting machine 12. Operation of the waterjet cutter 13 of the waterjet cutting machine 12 does not cause movement in the location or orientation of the poultry meat that ultimately results in poultry meat pieces 4. The desired orientation is determined by a user of the unloading machine 14 and supplied to the electronic controller 16, such as manufactured by Soft Robotics, by the user.

The laser scanned location, position and orientation information (or data) of the individual poultry meat pieces 4 from the laser scanner 11 is provided to the electronic controller 16. Based upon the data, the electronic controller 16 determines a pick-up position of the cut/trimmed poultry meat pieces 4 on the feed conveyer 18. The electronic controller 16 is operatively electrically connected to the robotic picking device 22, so that the robotic picking device 22 can locate each of the poultry meat pieces 4 that are being brought forward to the unloading machine 14 along the feed conveyer 18. The poultry meat pieces 4, for example chicken breasts, may arrive on the feed conveyer 18 at a rate of up to 80+ per minute.

As best shown in FIGS. 1 and 3, the exit conveyor 26 includes an electro-mechanical encoder 17 operatively electrically connected to the electronic controller 16 to provide the electronic controller 16 with information (or data) concerning position, velocity and direction of movement of the conveyor belt 27 of the exit conveyor 26 so that the robotic picking device 22 can place individual poultry meat pieces 4 onto the exit conveyor 26 in the desired orientation and location. Similarly, the feed conveyer 18 has an encoder or the like to supply speed and direction information to the electronic controller 16 in order to allow the position of the poultry meat pieces 4 to be known with precision.

The robotic picking device 22 includes a support unit 28 secured to the frame 15 of the unloading machine 14, and a plurality of articulating cooperating arms 29 interconnecting the support unit 28 to a pick-head 30. The robotic picking device 22 is configured to manipulate the articulating arms 29 to retrieve the poultry meat pieces 4 provided by the cutting machine 12 from the feed conveyer 18 by the pick-head 30 at the pick-up position, and to place the poultry meat pieces 4 onto the compartments 50 on the exit conveyor 26 so that the cut and trimmed poultry meat pieces 4 are arranged on the exit conveyor 26 in a desired orientation and location. In operation, the cut/trimmed (i.e., de-trimmed) poultry meat pieces 4 exit the waterjet cutting machine 12 on the feed conveyer 18, are picked from the feed conveyer 18 by the pick-head 30 of the robotic picking device 22, then placed in a specified manner (i.e., in the desired orientation and location) on the exit conveyor 26 of the unloading machine 14 for further processing.

As best illustrated in FIG. 6, the pick-head 30 of the robotic picking device 22 includes a base plate 38, and at least one picking tool 40, such as a parallel mGrip modular gripper system available from Soft Robotics (for example, part number FP-6-50-3-10-31.5SS), mounted to a bottom surface of the base plate 38. Moreover, each of the at least one picking tools 40 includes one or more pairs of pneumatically or hydraulically actuated symmetrical spaced gripping fingers 42 and 43 moveable toward and away from each other. The gripping fingers 42 and 43 are moveable pivotally toward and away from each other. According to the exemplary embodiment, the pick-head 30 includes two picking tools 40 each provided with three pairs of gripping fingers 42 and 43 configured to move pivotally toward and away from each other. The base plate 38 is mounted to distal ends of the articulating arms 29 of the robotic picking device 22. Further, the pick-head 30 (i.e., the base plate 38 along with the picking tools 40) is rotatable and moveable in directions parallel and perpendicular to the first and second directions $F_1$ and $F_2$. The pick-head 30 is also vertically moveable up and down relative to the support unit 28 of the robotic picking device 22, the feed conveyer 18 and the exit conveyor 26. The gripping fingers 42 and 43 of the picking tools 40 are manipulated by the electronic controller 16 so as to selectively grip or release one or two of the cut/trimmed poultry meat pieces 4 by moving the gripping fingers 42 and 43 toward and away from each other, respectively. The finger 42, 43 grasp the poultry pieces 4 when the fingers 42, 43 pivotally move towards each other and release the poultry pieces 4 when they move pivotally away from each other. The fingers 42, 43 thus resemble an index finger and opposed thumb of a hand that may grasp and release an article. Each of the picking tools 40 has a fitting 44 for receiving pressurized air for operation of the gripping fingers 42 and 43, as best shown in FIG. 6. According to the exemplary embodiment of the present invention, the fingers 42, 43 are designed to close when positive pneumatic pressure is applied to the fittings 44, and open when negative pneumatic pressure is applied to the fittings 44. The electronic controller 16 sets the pressures to articulate the fingers 42, 43. While gripping fingers 42, 43 are disclosed, those skilled in the art will recognize that other meat engaging systems may be used, such as vacuum devices, venturi devices and the like.

In operation, the gripping fingers 42 and 43 of picking tools 40 of the pick-head 30 of the robotic picking device 22 selectively grip one or two of the cut/trimmed poultry meat pieces 4 by moving the gripping fingers 42 and 43 toward each other, and pick the poultry meat pieces 4 from the feed conveyer 18. Then, the pick-head 30 of the robotic picking device 22 moves the gripped poultry meat pieces 4 to a position above the exit conveyer 26, and place the poultry meat pieces 4 onto or slightly above the moving exit conveyer 26. Next, the gripping fingers 42 and 43 of picking tools 40 release the poultry meat pieces 4 by pivoting the gripping fingers 42 and 43 away from each other, so that the cut/trimmed poultry meat pieces 4 are released and arranged on the exit conveyer 26 in the desired orientation and location. After that, the pick-head 30 of the robotic picking device 22 returns to initial position above the feed conveyer 18.

By arranging the exit conveyer 26 parallel to the feed conveyer 18, lateral movement of the pick-head 30 of the robotic picking device 22 is minimized to more easily and quickly accomplish its function of moving the poultry meat pieces 4 from the feed conveyer 18 to the exit conveyer 26 after removing the clinging trim from the poultry meat pieces 4 using the trim remover 20.

Alternatively, instead of the exit conveyer 26, the poultry meat pieces 4 may be placed by the pick-head 30 of the robotic picking device 22 directly into a packaging machine (not shown) or into packing trays placed on the exit conveyer. Those skilled in the art will recognize that a packaging line may be located adjacent the feed conveyer, so that pick-head 30 places the poultry pieces 4 into packing, such as foam trays, that may thereafter be encased in plastic wrap for eventual distribution to users. Such a packaging line typically will include a movable conveyer on which the foam trays are positioned in order to be located adjacent the pick-head 30 in order to receive one or more poultry pieces 4 while advancing the foam trays to the wrapping equipment.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. An automated unloading machine for unloading cut and trimmed chicken meat pieces from an upstream poultry meat cutting machine, the automated unloading machine operably associated with a feed conveyer configured to support the cut and trimmed poultry meat pieces provided by the meat cutting machine, the automated unloading machine comprising:
   one of an exit conveyer and a packaging machine for operable association with the feed conveyer;
   an electronic controller configured to receive and process position and orientation data of the poultry meat pieces located on the feed conveyer; and
   a robotic picking device operatively associated with the electronic controller and configured to pick the poultry meat pieces from the feed conveyer and to place the poultry meat pieces onto one of the exit conveyer and the packaging machine so that the cut and trimmed poultry meat pieces are arranged on one of the exit conveyer and the packaging machine, further comprising a trim removing device configured to remove loose trim from at least one of the poultry meat pieces wherein the trim removing device includes at least one air nozzle operatively associated with and disposed above the feed conveyer and configured to blow trim away from at least one of the poultry meat pieces with pressurized air.

2. The automated unloading machine according to claim 1, wherein the electronic controller receives and processes the position and orientation data of the poultry meat pieces located on the feed conveyer from a scanner operatively associated with the electronic controller.

3. The automated unloading machine according to claim 1, wherein the trim removing device further includes at least one scrubber operatively associated with and disposed above the feed conveyer and configured to remove trim from the at least one of the poultry meat pieces.

4. The automated unloading machine according to claim 3, wherein the least one scrubber is disposed downstream of the at least one air nozzle.

5. The automated unloading machine according to claim 3, wherein the at least one scrubber includes a rotatable scrubber brush.

6. The automated unloading machine according to claim 5, wherein the feed conveyer is movable in a first direction, and wherein the scrubber brush rotates about a rotational axis parallel to the first direction.

7. The automated unloading machine according to claim 1, wherein the feed conveyer is movable in a first direction, the trim removing device includes two spaced air nozzles, and the two air nozzle are disposed above the feed conveyer symmetrically in a direction perpendicular to the first direction.

8. The automated unloading machine according to claim 7, wherein the trim removing device further includes two scrubbers, wherein the two scrubbers are disposed downstream of the two air nozzles, wherein the two scrubbers are disposed above the feed conveyer symmetrically in the direction perpendicular to the first direction, and wherein the scrubbers each include a rotatable brush adapted to engage the poultry pieces.

9. The automated unloading machine according to claim 1, wherein the trim removing device includes at least one scrubber disposed above the feed conveyor.

10. The automated unloading machine according to claim 9, wherein the at least one scrubber includes a rotatable scrubber brush.

11. The automated unloading machine according to claim 10, wherein the feed conveyer is movable in a first direction, and wherein the scrubber brush rotates about a rotational axis parallel to the first direction.

12. An automated unloading machine for unloading cut and trimmed chicken meat pieces from an upstream poultry meat cutting machine, the automated unloading machine operably associated with a feed conveyer configured to support the cut and trimmed poultry meat pieces provided by the meat cutting machine, the automated unloading machine comprising:
   one of an exit conveyor and a packaging machine for operable association with the feed conveyer;
   an electronic controller configured to receive and process position and orientation data of the poultry meat pieces located on the feed conveyer; and
   a robotic picking device operatively associated with the electronic controller and configured to pick the poultry meat pieces from the feed conveyer and to place the poultry meat pieces onto one of the exit conveyor and the packaging machine so that the cut and trimmed poultry meat pieces are arranged on one of the exit conveyor and the packaging machine, wherein the robotic picking device includes a support unit, articulating arms interconnecting the support unit to a pick-head configured to pick the poultry meat pieces from the feed conveyer and to place the poultry meat pieces to one of the exit conveyor and the packaging machine.

13. The automated unloading machine according to claim 12, wherein the pick-head includes a base plate and at least one picking tool mounted to the base plate.

14. The automated unloading machine according to claim 13, wherein the at least one picking tool includes at least one pair of spaced gripping fingers moveable toward and away from each other for selectively gripping or releasing the poultry meat pieces.

15. The automated unloading machine according to claim 14, wherein the gripping fingers of the at least one picking tool are moveable pivotally toward and away from each other.

16. The automated unloading machine according to claim 12, wherein the pick-head is rotatable and linearly moveable relative to the feed conveyor.

* * * * *